Oct. 1, 1963     D. C. GLASSIE ET AL     3,105,931

APPARATUS FOR GENERATING ELECTRIC POWER

Filed Dec. 31, 1958

INVENTOR.

DONELSON CAFFERY GLASSIE
CLYDE BENJAMIN STEVENS, JR.

by Charles L. Sturtevant

United States Patent Office 3,105,931
Patented Oct. 1, 1963

3,105,931
APPARATUS FOR GENERATING ELECTRIC POWER
Donelson Caffery Glassie, Chevy Chase, Md. (1917 N St. NW., Washington, D.C.), and Clyde Benjamin Stevens, Jr., Arlington, Va. (2840 Concord Road, Cleveland, Ohio)
Filed Dec. 31, 1958, Ser. No. 784,251
9 Claims. (Cl. 322—28)

This invention is concerned generally with the generation of electric power, and more particularly with a generator for an automobile engine or the like.

Present day automobiles require large amounts of electric power to operate large numbers of lights and to run accessories such as radios, air conditioners, windshield wipers, retractable tops, and the like. Unfortunately, the electrical load is likely to be at, or near a maximum when the engine is idling. If a conventional generator is set to provide sufficient voltage at low speeds, much too high a voltage will be produced when the accompanying engine is operated at road speeds. Conversely, if the voltage is adjusted for road speeds, it will be much too low at idle speeds.

Accordingly, it is an object of this invention to provide an automobile generator which will provide a substantially constant output voltage regardless of engine speed.

More particularly, it is an object to provide such a generator wherein the output frequency is also substantially constant.

A further object of this invention is to provide an automobile or the like generator having both a rotatable armature and a rotatable field wherein the speed of one thereof is regulated to produce a substantially uniform output voltage.

Yet another object is to provide such a generator wherein the speed of the armature is regulated by voltage sensitive means.

Other and further objects and advantages of the present invention will be apparent from the following description when taken in connection with the accompanying drawings wherein.

Figure 1:
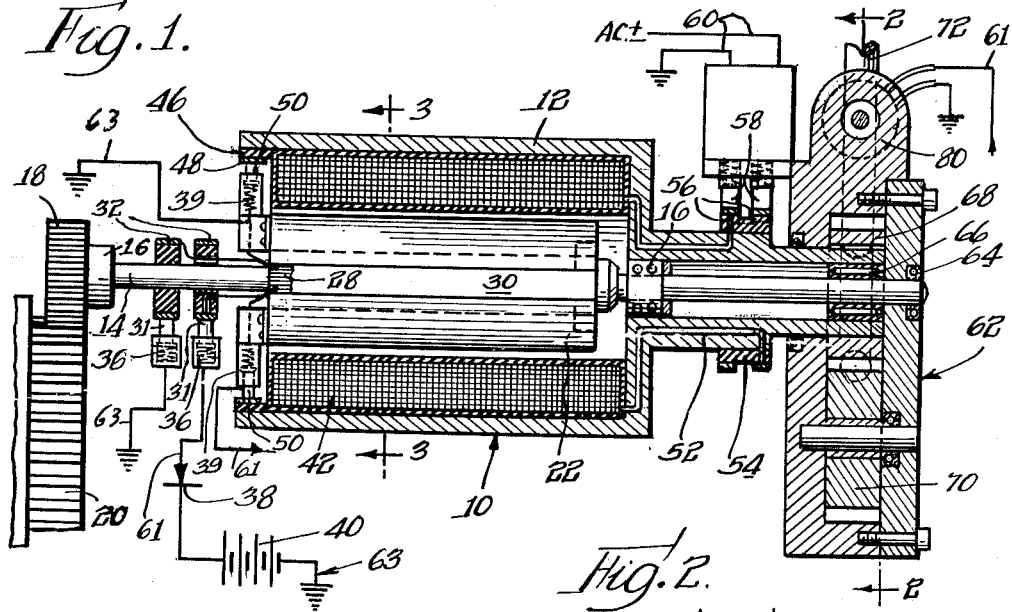
FIG. 1 is a longitudinal sectional view of a generator constructed in accordance with the principles of this invention.
Figure 3:
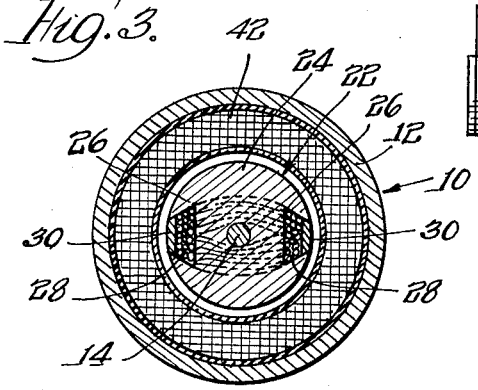
FIG. 3 is a cross sectional view of the armature and field along the line 3—3 in FIG. 1.

Referring now in greater particularity to the drawing; there will be seen a generator 10 having a frame 12. A shaft 14 is journalled in suitable bearings 16 in the frame 12. This shaft has a gear 18 thereon meshing with a gear 20 which is driven at a speed proportional to the speed of the automobile engine and may be or may not be driven by the ring gear of an associated automobile engine.

A field 22 is fixed on the shaft 14 and includes a cylindrical magnetic structure 24 having dovetail slots 26 therein. Field windings 28 are held in the slots by wedges 30.

A pair of slip rings 32 is fixed in insulated relation on the shaft 14. The ends of the field winding 28 are connected to the slip rings 32 in accordance with conventional practice. A pair of fixed brushes 31 carried by brush holders 36 supplies direct current to the battery 40 of the automobile through a reverse current relay 38. A second pair of brushes 50 is mounted on the field assembly 22 and rotates therewith. These brushes 50 are electrically connected to the ends of the field coil 28.

An armature 42 is concentric about the field 22, being supported by the frame 12, the latter being rotatably supported by one of the aforesaid bearings 16. Insulating support means 46 at the end of the armature carries a commutator 48 engaged by a pair of brushes 50 respectively carried by brush holders 39. The segments of the commutator 48 are connected to the direct current windings of the armature 42.

An axial extension 52 of the frame is provided with insulating means 54 carrying slip rings 56 connected to the alternating current windings of the armature 42, the slip rings being engaged by brushes 58 connected to the A.C. output wires 60.

Figure 2:
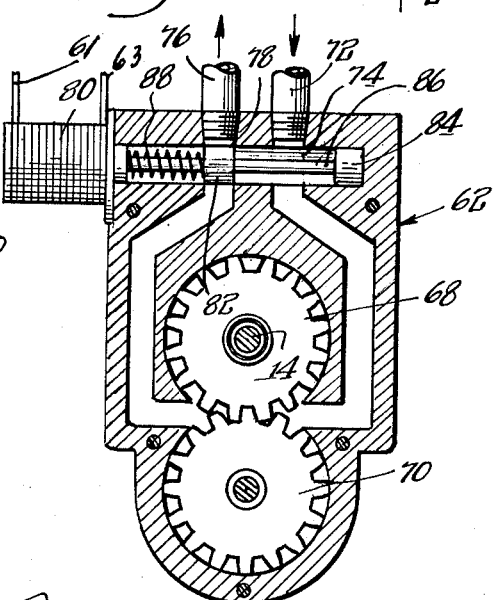
FIG. 2 is a cross sectional view of the oil pump along the line 2—2 in FIG. 1.
Figure 4:
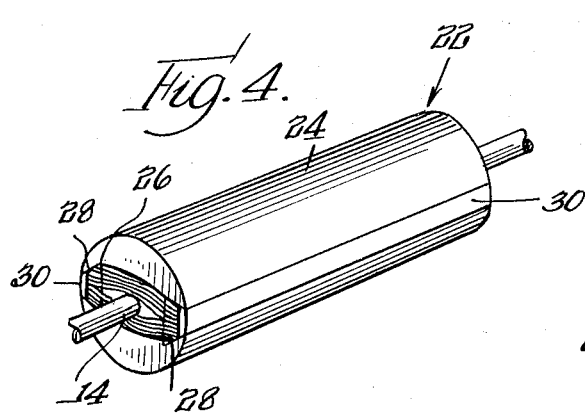
FIG. 4 is a perspective view of the field.

The shaft 14 extends into a gear pump 62 where it is journalled by a bearing 64. The extension 52 is journalled on the shaft by bearings 66 and has one gear 68 of the pump 62 fixed thereon. The other gear 70 meshes therewith in accordance with conventional practice. The pump has an oil inlet 72, fed by the automobile engine lubricating oil pump through a valve 74, and an outlet 76 through a valve 78 discharging to the engine crankcase. A solenoid 80 actuates the valve closure members 82 and 84 on a common shaft 86 against a spring 88. The solenoid is connected to the direct current output wires 61 and 63 and responds proportionally to battery charging voltage. As will be seen in FIG. 2, the rest position of the parts is such that the member 82 closes the valve 78, while the member 84 is displaced from the valve 74 with the latter wide open.

As will now be apparent, both the field structure and the armature rotate. The relative speed determines the output voltage. Since voltage is a function of speed, it is apparent that holding the output voltage constant also results in holding the frequency constant. If the armature were free to rotate (the field being driven), the magnetic forces would cause the armature to rotate at field speed less a small amount of slip. Useful voltage and power are produced by controlled braking of the armature. In the illustrative embodiment, the drag is produced by throttling oil pumped from the engine crankcase by the gear pump 62.

With the automobile engine at idle speed, as in heavy traffic, engine speed is at a minimum while electric power demands may be near the rated capacity of the generator. Current flows from the armature to the field and through the reverse current relay to the battery. The oil pump discharge valve is held substantially fully closed by the spring and the armature is substantially locked. This produces maximum generator output at the engine idle speed. As the engine speed increases, the field speed increases, thus tending to produce an over voltage. The solenoid thus is actuated to open the outlet valve all or part way as is necessary. This allows the armature to rotate to hold the speed relative to the field and the output voltage substantially constant. The solenoid upon ever increasing speeds (or light loads) progressively opens the outlet valve and closes the inlet valve (the latter starting to close only after the former is completely open) whereby progressively to lighten to load braking the armature, thus allowing the armature to tend to approach field speed. With the engine at maximum speed and with minimum electric load, the outlet valve will be fully open and the inlet valve fully closed—but admitting just sufficient oil to permit pump lubrication.

It will be apparent that under all but extreme conditions the armature will produce enough D.C. voltage to energize the field and to charge the battery through the reverse current relay.

The A.C. output may be used for operating electric accessories in the car, or can be used to provide power to a home in case of failure of the usual commercial sources of supply (or for remote cabins and the like where power is desired only occasionally).

The specific example of the invention herein set forth is for purposes of illustration only. Various changes in structure will be apparent to those skilled in the art, and will be understood as forming a part of this invention insofar as they fall within the spirit and scope of the appended claims.

We claim:

1. A generator for use in combination with a variable speed power source such as an automobile engine comprising an armature, means mounting said armature for rotation, a field, means mounting said field for rotation independently of said armature concentric with said armature in inductive relation therewith, contact means cooperating with said armature for deriving a voltage therefrom, means for rotating one of said field and armature, voltage sensitive means connected to said contact means and to the other of said field and armature, and fluid pressure means responsive to said voltage sensitive means for braking said other thereof in accordance with the voltage derived from said armature.

2. A generator as set forth in claim 1, wherein the field is driven and wherein the braking means is connected to the armature.

3. A generator as set forth in claim 1, wherein the armature is mounted around and outside of the field.

4. A generator as set forth in claim 1, wherein the voltage deriving means comprises slip rings, and the voltage is A.C.

5. A generator as set forth in claim 1, wherein the fluid pressure means comprises an oil pump having electrically controlled oil flow control means.

6. A generator for use with a variable speed power source such as an automobile engine comprising an armature, means mounting said armature for rotation, a field, means mounting said field for rotation independently of said armature concentric with said armature and in inductive relation therewith, slip ring means on said field, commutator means on said armature for deriving a D.C. potential therefrom, slip ring means on said armature for deriving an A.C. voltage therefrom, means for supplying D.C. potential to said field slip ring means for energizing said field, said D.C. potential suppling means including said armature commutator means, means for rotatably driving one of said field and armature, and means for braking the other thereof, said braking means including voltage sensitive means operatively connected to said slip ring means and fluid pressure means responsive to said voltage sensitive means and wherein said fluid pressure means comprises a hydraulic pump having electrically controlled fluid flow control means.

7. A generator as set forth in claim 6, wherein the pump comprises a gear pump having separated inlet and outlet control means.

8. A generator as set forth in claim 7, wherein the inlet and outlet control means are interconnected.

9. A generator as claimed in claim 1, wherein the armature includes a shaft extension and the fluid pressure means includes a gear pump with one gear thereof secured to said shaft extension.

References Cited in the file of this patent

UNITED STATES PATENTS

| | | |
|---|---|---|
| 522,241 | Thomson | July 3, 1894 |
| 865,732 | Vandervell et al. | Sept. 10, 1907 |
| 1,586,569 | Newman | June 1, 1926 |
| 2,170,193 | Godsey | Aug. 22, 1939 |